United States Patent [19]
Fernandes et al.

[11] Patent Number: 5,768,057
[45] Date of Patent: Jun. 16, 1998

[54] AIR VANE LATCH INCORPORATING TOP COVER PROFILING

[75] Inventors: Mark Joseph Fernandes, Santa Cruz; Narayanaswamy Pasupathy; Long Van Ngo, both of San Jose; Ramgopal Battu, Canoga Park, all of Calif.

[73] Assignee: Seagate Technology, Inc., Scotts Valley, Calif.

[21] Appl. No.: 553,068

[22] Filed: Nov. 3, 1995

Related U.S. Application Data

[63] Continuation-in-part of Ser. No. 116,919, Sep. 7, 1993, abandoned.

[51] Int. Cl.[6] ............................................. G11B 5/54
[52] U.S. Cl. ............................................. 360/105
[58] Field of Search ........................ 360/104–106, 360/137

[56] References Cited

U.S. PATENT DOCUMENTS

| | | | |
|---|---|---|---|
| 4,538,193 | 8/1985 | Dimmick et al. | 360/137 |
| 4,647,997 | 3/1987 | Westwood | 360/105 |
| 4,692,829 | 9/1987 | Campbell | 360/105 |
| 5,036,416 | 7/1991 | Mastache | 360/105 |
| 5,043,834 | 8/1991 | Kubo et al. | 360/105 |
| 5,319,511 | 6/1994 | Lin | 360/105 |
| 5,363,261 | 11/1994 | Eckberg et al. | 360/105 |

*Primary Examiner*—Allen Cao
*Attorney, Agent, or Firm*—Flehr Hohbach Test Albritton & Herbert LLP

[57] ABSTRACT

A latch system for use in a disc drive is provided wherein a latch system comprises a latch arm having an engaging portion for engaging an engaging transducer support arm for a disc drive to prevent movement of the transducer, and a wind vane that extends partially along an arc or a line near to the edge of the disc. The latch arm and vane are arranged so that in the presence of disc rotation wind presses against the vane, and the vane moves away from the disc. In order to make the vane effective and create sufficient torque or force against the surface of the vane, the top surface of the disc drive housing is depressed in the region of the disc which is upstream from the location of the vane, where by upstream is meant that the rotation of the disc causes wind to be generated which flows under the top portion of the housing and then impacts against the vane. By providing a specifically defined, depressed region in the top housing surface, sufficient torque is generated by the airflow as caused by rotation of a disc for the wind to open the vane when the disc drive is operating.

5 Claims, 5 Drawing Sheets

| Torque Measurement | | Force (lbf) @ 0.63" | |
| --- | --- | --- | --- |
| | | 1 Disc | 2 Disc |
| 4500 rpm | Baseline – | $2.24 \times 10^{-4}$ | $4.48 \times 10^{-4}$ |
| | Modified TC – | $3.28 \times 10^{-4}$ | $6.37 \times 10^{-4}$ |
| | Modified Base – | $2.52 \times 10^{-4}$ | $5.0 \times 10^{-4}$ |
| 5400 rpm | Baseline – | $3.13 \times 10^{-4}$ | $6.25 \times 10^{-4}$ |
| | Modified TC – | $4.62 \times 10^{-4}$ | $8.97 \times 10^{-4}$ |
| | Modified Base – | $3.48 \times 10^{-4}$ | $6.86 \times 10^{-4}$ |
FIG. 5A
Modified Top Cover
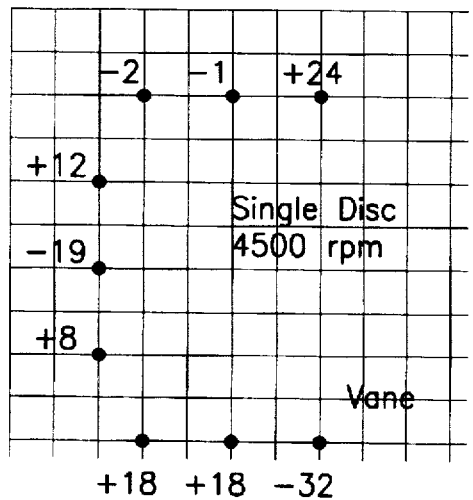
FIG. 5B
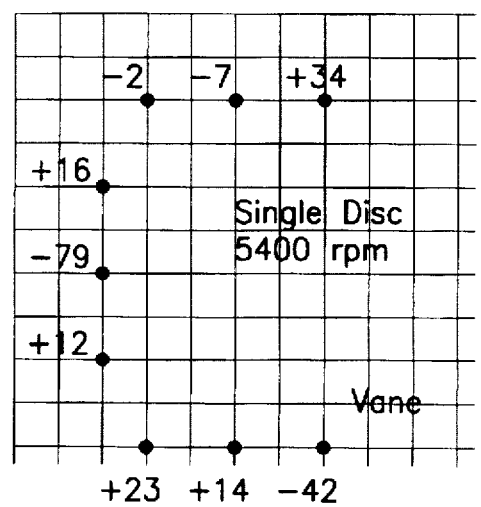
FIG. 5C

AIR VANE LATCH INCORPORATING TOP COVER PROFILING

CROSS-REFERENCE TO RELATED APPLICATION

This application is a continuation-in-part of U.S. application Ser. No. 08/116,919 filed Sep. 7, 1993, now abandoned.

FIELD OF THE INVENTION

The field of the invention relates to a latch system for use in a disc drive, and more particularly to an improved disc drive design for increasing the torque applied to the latch.

BACKGROUND OF THE INVENTION

It is well known that in rotating,non-removable data disc storage devices, a data read/write transducer flies upon an air cushion or bearing in extremely close proximity to the data surface. In many disc drives, including those which are of relatively small size, the transducer lands upon and takes off from a particular predefined landing region. It is possible, when shocks are applied to the disc drive, that the transducer can bounce or move across the surface of the disc, causing erosion or scarring of the magnetic film coating on the disc data zone surface. These such scars can lead to hard and soft data failures. In addition, the hard transducer may dent the surface of the data storage regions in response to shocks attributable to sharp or rough handling of the drive.

The characteristics of the air flow that are generated incident to the rotation of the storage in a discs in a drive, are analyzed and discussed in the prior art, as shown for example in U.S. Pat. No. 4,647,997 to Westwood and the IBM Journal of Development and Research 1974 pages 480–488. It has been established that two commonly mounted, spaced apart, rotating discs generate a significantly cantly greater air flow than is generated by a single rotating disc, and that the amount of air flow within the housing surrounding the discs is also a function of disc diameter and angular velocity. It is further known that the air flow force is greatest adjacent the periphery of the rotating discs and especially at the region defined between the two rotating discs and that it falls off rapidly as a non-linear function as the vane moves away from the disc periphery.

The results of these studies and as disclosed in the cited Westwood Patent as well as in U.S. Pat. 4,538,193, are aerodynamically actuated latches have been designed and intended to be incorporated in small size disc drives. Such latches have not been totally effective because of the lack of sensitivity and responsiveness to the limited air flow in small size disc drives. It has been found that the air flow values in such small disc drives must be accounted for carefully and in many cases are of too small a magnitude to effectively, reliably and responsively release the actuator when the discs begin rotation.

Furthermore, the cited references as well as U.S. Pat. No. 4,692,829 to Campbell, disclose aerodynamically actuated latches in which an air vane latch covers the space between two rotating discs of a disc drive assembly;

however, the known attempts to incorporate an air vane latch in a small size disc drive using a single disc have been ineffective because of the lack of sufficient air flow to reliably release the latch. Further, the spring force that restrains the transducer actuator assembly in the landing zone when the drive is not operating must also be carefully selected and calibrated so that the force can be overcome when the discs begin to move; it has been proven difficult to reliably calibrate and calculate such a spring force within the narrow allowed limits resulting from limited wind velocity.

Thus a need has arisen and continues to exist for a reliable responsive design for a air flow responsive latch flow mechanism incorporated into the housing for a single disc drive having one or more discs where the latch is responsive to the air flow generated in a small form factor disc drive to reliably latch and release the actuator mechanism, while continuing to restrain the actuator against relatively strong shocks.

SUMMARY OF THE INVENTION

A general object of the present invention is to overcome certain limitations and drawbacks in known aerodynamically operated latches for transducer actuator assemblies in a disc drive.

A further object of the invention is to provide an effective aerodynamic transducer latch mechanism within the confines of a miniaturized disc drive structure even utilizing a single disc.

A further object of the invention is to provide a design which integrates the aerodynamic latch and the housing so that the latch has sufficient effective torque applied to it by the air generated by the rotating disc so that the latch remains disengaged even as it rotates away from the edge of the disc.

According to one aspect of the invention, there is provided a latch system for use in a disc drive wherein a latch system comprises a latch arm having an engaging portion for engaging an engaging transducer support arm for a disc drive to prevent movement of the transducer, and a vane characterized by the fact that the vane is located at a distance from the center of the disc of the disc drive at a distance which is greater than the radius of the disc and extends partially along an arc or a line near to the edge of the disc. The latch arm and vane are arranged so that in the presence of disc rotation wind presses against the vane, and the vane moves away from the disc.

In order to make the vane effective and create sufficient torque or force against the surface of the vane even when the vane has moved away from the edge of the rotating disc and even where only a single disc is used, the aerodynamically powered latch of the present invention is incorporated in a disc drive including a base casting and a top casting defining a chamber. Preferably, the top surface of the chamber is depressed in the region of the disc which is upstream from the location of the vane, where by upstream is meant that the rotation of the disc causes wind to be generated which flows under the top portion of the housing and then impacts against the vane. By providing a specifically defined, depressed region in the top housing surface, sufficient torque is generated by the airflow as caused by rotation of a disc for the wind to press against the wind vane and cause the vane to move around its center of rotation, away from the edge of the disc, and to remain away from the edge of the disc until rotation of the disc ceases. Preferably, the wind vane flag is shaped to follow the contour of the edge of the rotating disc or discs and has one end extending near to the sidewall of the housing to capture the maximum amount of effective windage generated by the rotation of the disc. Other features and advantages of the present invention will be understood by a person of skill in the art who studies the present invention disclosure as explained with reference to the following figures wherein:

BRIEF DESCRIPTION OF DRAWINGS

FIG. 5A illustrates torque measurements made on a disc drive incorporating the modified top cover and a modified base as well as at Figure 5B and 5C pressure measurements illustrating the effective air pressure against the surface of the vane utilizing the present invention.

DETAILED DESCRIPTION OF A PREFERRED EMBODIMENT

Figure 1:
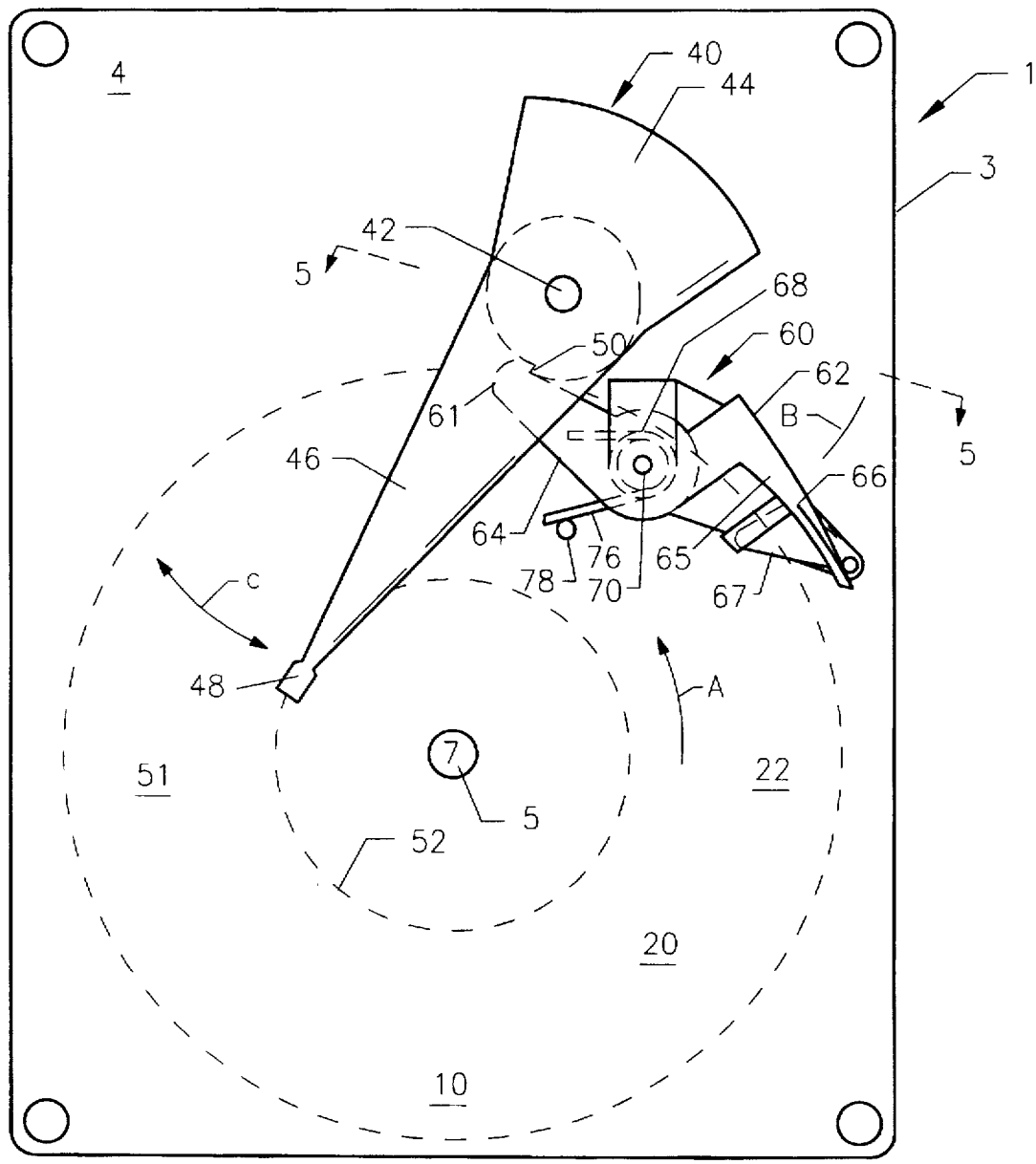
FIG. 1 is an enlarged top plan view of miniaturized disc drive incorporating some of the principals of the present invention which with the latch being shown.

FIG. 1 shows in a plan view the basis elements of a miniaturized disc drive incorporating a latch with which the wind vane of this invention is useful, showing the latch in the latched position. Briefly, it can be seen that as the disc spins in the direction of the arrow A in a counterclockwise direction, the spinning disc creates a moving sheet of air which acts against the air vane flag 66 causing movement of the vane in the direction of the arrow B with sufficient force to unlatch the latch at 50 and allow the actuator arm 40 to move freely.

Referring more specifically to the details of what is shown as a miniaturized disc drive in FIG. 1, the disc drive includes a unitary housing 3 and a disc spindle 5 having an axis of rotation 7. The spindle S is coupled directly to an electronically commutated brushless DC spindle motor (not shown) supported from the base casting 4 and rotating at a constant speed to rotate the data storage disc 10 in the counterclockwise direction shown by arrow A. This rotation typically occurs at a predetermined and constant angular velocity. The data storage disc 10 provides data storage surfaces on tracks generally indicated at 20 on the upper and lower surfaces of the disc 10. The surfaces are characterized by the presence of suitable magnetic storage media which may be such materials as are well known in the art, which are coated, plated, or deposited on the surfaces of the disc. The disc 10 and the miniaturized mechanism generally indicated at 3 is preferably about 47 millimeters in diameter, although the present invention may be useful with both smaller and larger disc drive sizes. More particularly, this invention is especially useful and important in disc drives utilizing a single disc, wherein reliable activation of the vane 66 is difficult to achieve because of the limited aerodynamic pressures which can be generated. It is also especially useful in very small size disc drives, where little extra height is available.

The rotary actuator arm assembly 40 is provided which is bidirectionally rotatable and is journalled to the base casting 4 at an axis of rotation 42. The actuator arm assembly 40 rotates bidirectionally in a range of movement along an arc of approximately 30 degrees as indicated by the arrow C in FIG. 1. The arm assembly 40 includes a coil (not shown) adjacently overlying a premagnetized permanent magnet in a region generally indicated at 44. Energization of this coil causes selective movement of the actuator arm along the path C to move the transducer support arm 46 and thereby transducer 48.

The transducer support arm 46 extends out over the surface of the disc and supports the slider assembly 48 for the transducer, supporting the transducer to fly typically 3 to 15 microinches above the data surface on an airbearing or cushion of air resulting from the disc rotation.

The aerodynamic latch of this invention include latch arm 64 having a finger 61 engaging a notch 50 on or near the center of rotation of the transducer support arm to hold the arm in the landing zone over the surface of the disc when the disc drive is not in use. Although this is one possible configuration for the latch engagement arm, many others are possible used in combination with the wind latch of this invention; the significant features of the invention are the cooperation of the wind vane 66 and the profiled top cover of the housing to be described in detail below.

In this embodiment with which the invention is useful, when wind vanes 66 is close adjacent to the edge of the rotating disc 20, then the latch arm engages the actuator arm. When the disc rotates in the direction A generating sufficient wind pressure against the facing surface of the wind vane 66, then the vane moves in the direction of the arrow B and the latch arm 64 causes engaging finger 61 to disengage from the notch 50.

Figure 4:
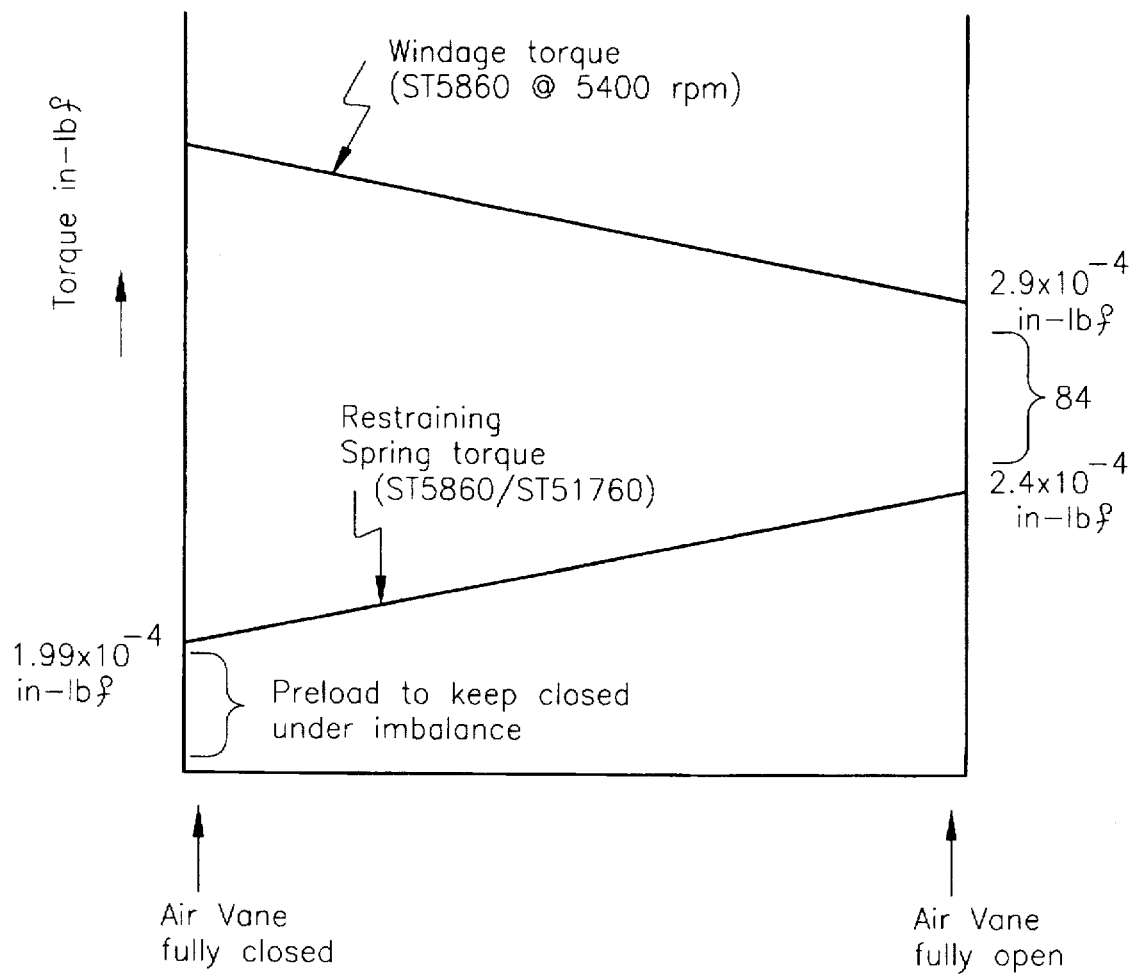
FIG. 4 is a graph illustrating the relationship between the restrained torque applied to the wind vane to hold it in place by a restraining spring relative to the windage torque applied to the air vane as it moves from a fully closed to a fully opened position.

Typically, means are also provided to bias the air vane latch to the closed, engaged position in FIG. 1 so that the actuator arm is secure, even in the event of significant shock. A spring 76 is provided wound around the center of rotation of the air vane 66 and latch arm 64, having one end bearing against a post 78. The force of the spring normally biases the wind vane to closed position shown in FIG. 1. By closed position, it is meant that the latch engagement arm 64 has engaged the notch, the wind vane flag 66 is closely adjacent to the disc, and the actuator assembly 40 has moved the transducer slider assembly 48 to the landing zone 52. The design constraints which apply to this aspect of the present device are illustrated in FIG. 4 where the countervailing effects of the spring, and the air blowing against the air vane flag 66 are graphically displayed. As can be seen, the spring is provided with a certain level of spring preload, which together with frictional effects maintains the air vane flag in its closed or home position, with engagement arm 64 securely latching the actuator assembly by engaging notch 50. As the discs begin to turn in the direction of arrow A and air moves against the air vane flag 66, the vane is displaced in the direction of the arrow B.

Obviously, for the same speed of rotation of the discs, the further the vane 62 moves from the edge of the disc, the more dispersed the effects of the air flowing against the air vane flag 66; thus the torque of the air against the air vane flag diminishes as the vane moves from the fully closed to the fully open position. Concurrently, the engagement arm 64 moves in a direction opposite to arrow B, and away from its latching position, the spring 76 is wound more tightly, increasing the torque exerted by the spring; thus the spring attempts to restore the wind vane 66 to its closed position. It is therefore critical to maintain a margin 84 between the spring torque and the wind torque, so that the torque of the wind is not entirely overcome. Thus, it is essential to optimize the effects of the wind generated by the rotation of the disc against the surface of the wind vane.

Figure 2:
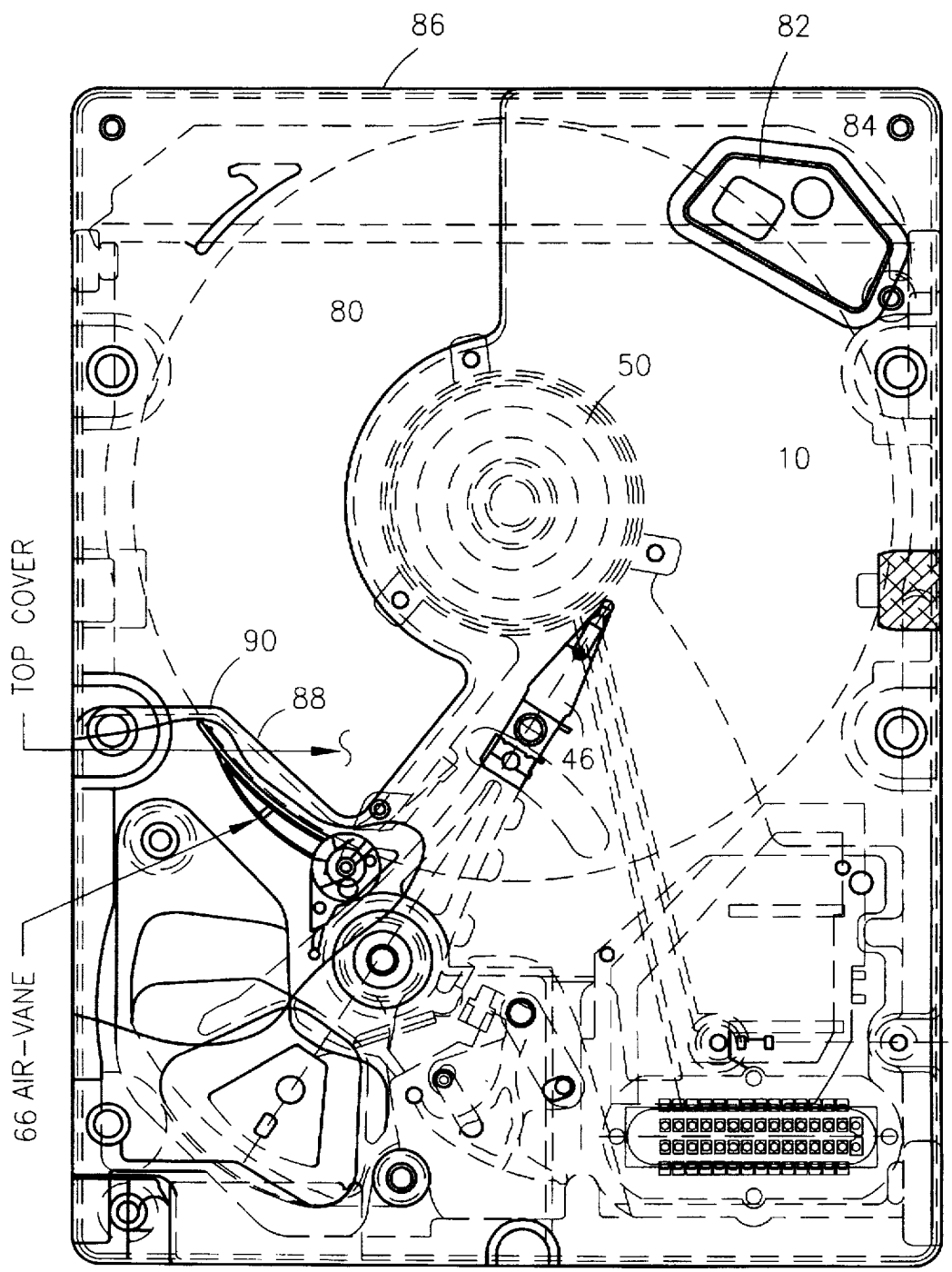
FIG. 2 is a top plan view of a disc drive incorporating the present invention illustrating both the location of the wind vane latch.

According to this invention, the increased air pressure and thus increased torque to move the vane away from the disc is achieved by providing a depressed region 80 in the surface of the top cover over a portion of the top surface of the topmost or single disc 10 as shown in FIG. 2. This depressed region extends circumferentially from near to air vent 82 in the top cover 84 of the disc circumferentially around to a line which extends across the top surface of the disc approximately parallel to the center line of the actuator arm 46.

Radially, the depressed region extends from a point near to the mounting hub 50 out to the outer edge 86 of the cover 84. To be most effective, it has been found that the depressed region should extend as close as possible to the landing area of the actuator arm, although it must end at this point to provide necessary clearance for movement of the actuator arm. However, the radially outer edge 88 of the depressed region 80 must be tailored to run parallel to the outer edge of the disc and extend along the inner edge of the surface of the disc in the region where the air vane will be moving; it then bends out to join the outer edge of the cover at a radial point 90 where the vane ends.

Figure 3:
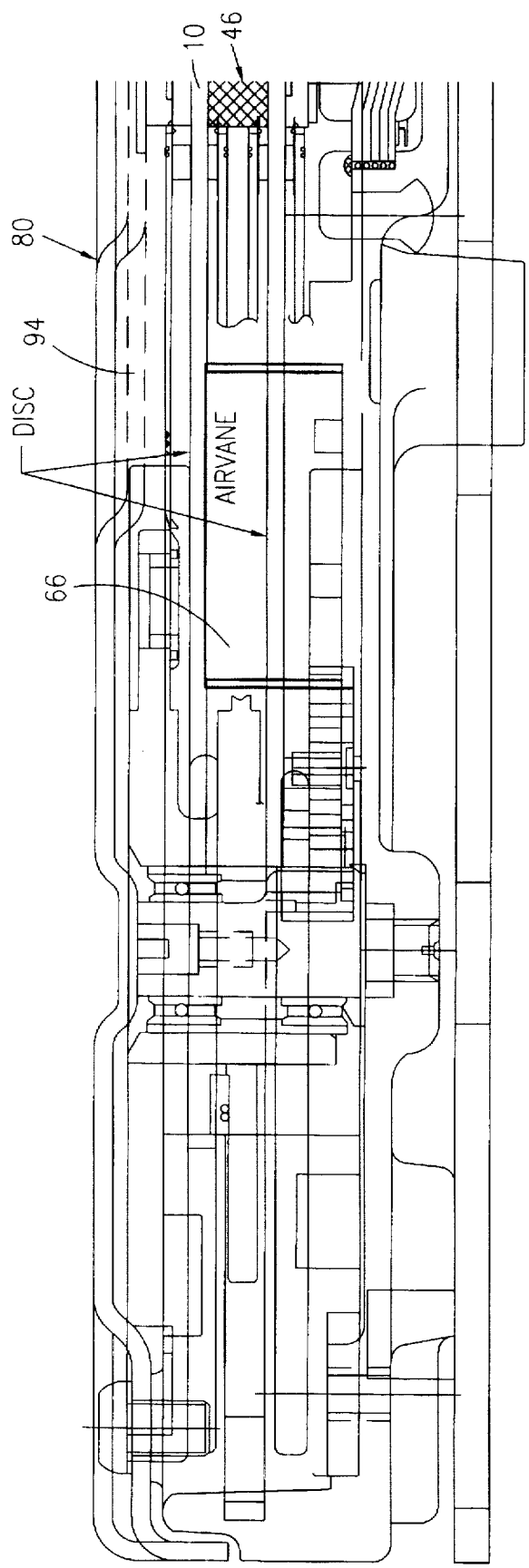
FIG. 3 is a vertical side view of the present invention illustrating the top cover and air vane.

Turning to the side view of FIG. 3, it can be seen that he depth of the top cover depression indicated at 80 is not great, as the necessary clearance for top disc 10 in what is shown herein as a two-disc design as well as for the actuator 46 limit the depth of the depression. The objective as clearly appears by the horizontal line 94 indicating the bottom of the depression, is to bring the top cover just barely above the top surface of the rotating disc so that the air is forced between this top surface of the top most disc and the depressed surface of the cover. As the air exits this region, it impacts the air vane 66 and effectively moves it away from the edge of the disc; as can be seen by returning to the top view of FIG. 2, the air exits between the side regions 88, 90 of the depressed regions will continue to have an impact against the air vane even as the air vane 66 rotates away from the edge of the rotating disc 10. Thus the necessary force to overcome the spring return force as defined in FIG. 5 is consistently applied to the rotating vane by the preferred embodiment.

Typical torque measurements for discs operated at both 4500 RPM and 5400 RPM are shown in FIG. 5A, with the "baseline" representing the torque measurement against a disc with an unmodified cover; "modified TC" representing torque measurement for a modified top cover: and "modified base" representing the improved torque against the vane if a similar modification were made to the base rather than to the top cover.

The pressure distribution under the depressed region of the disc is shown in FIGS. 5B and 5C and clearly establishes a variation in pressures circumferentially extending underneath the depressed region, with the most dramatic increases in pressure being in the regions where air would exit from underneath the depressed top cover region and impact the vane.

These measurements clearly establish the effectiveness of the present approach, and especially incorporating the depressed region into the top cover.

Having described the above embodiment of the invention, it can be appreciated that the objects of the present invention can be fully achieved thereby. It will also be understood by those of skill in the art that changes in construction and different embodiments of the application will suggest themselves without departure from the spirit and scope of the invention. The disclosures and description herein are illustrative and are not intended to be in any sense limiting. The scope of the present invention is intended to be defined by the following claims.

What is claimed:

1. A latch system for use in a disc drive, the latch system comprising a latch arm for engaging a transducer support arm of the disc drive to substantially prevent movement of the transducer support arm, a vane coupled to said latch arm for moving said latch arm with movement of said vane, said vane being located at a distance from the center of a disc of the disc drive greater than the radius of the disc and extending partially along an outer circumference of said disc, rotation of the disc generating wind pressing against the vane to move the vane away from the disc outer circumference and causing the latch arm to disengage from the transducer support arm allowing said support arm to move said transducer over said disc surface, the disc drive further comprising a top cover portion having a depressed region extending over a portion of the disc ending near to the location of said vane to enhance wind pressure established by rotation of said disc against said air vane.

2. A latch system for use in a disc drive as claimed in claim 1 wherein said depressed portion of said cover extends circumferentially over said disc to a point opposite a top surface of said disc where said actuator arm is located and extending circumferentially to a point on said disc nearly adjacent to said actuator arm.

3. A latch system for use in a disc drive as in claim 2 wherein said circumferential depressed region of said cover ends in a line extending substantially parallel to a center line of said actuator arm and near to said actuator arm.

4. A latch system for use in a disc drive as in claim 3 wherein said depressed portion of said cover extends from a line near to and parallel to a circumferential line defining a house for supporting said disc and extending radially outward to an edge of said top cover.

5. A latch system for use in a disc drive as claimed in claim 4 wherein said circumferential region ends in a line extending substantially parallel to said wind vane and extending along the edge of said disc parallel to said wind vane for the length of said wind vane and then extending radially outward to the outer edge of said top cover.

* * * * *